S MYERS.
Plow.
No. 2,712.　　　　　　　　　　Patented July 11. 1842
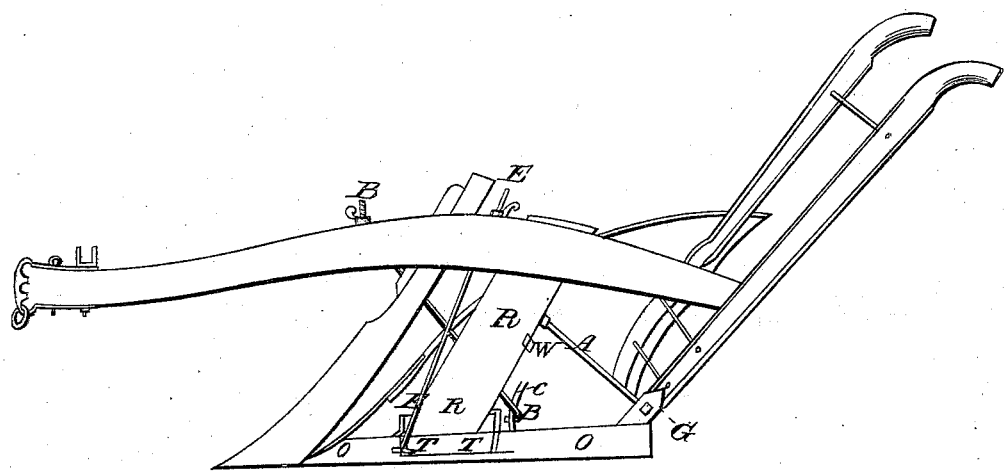
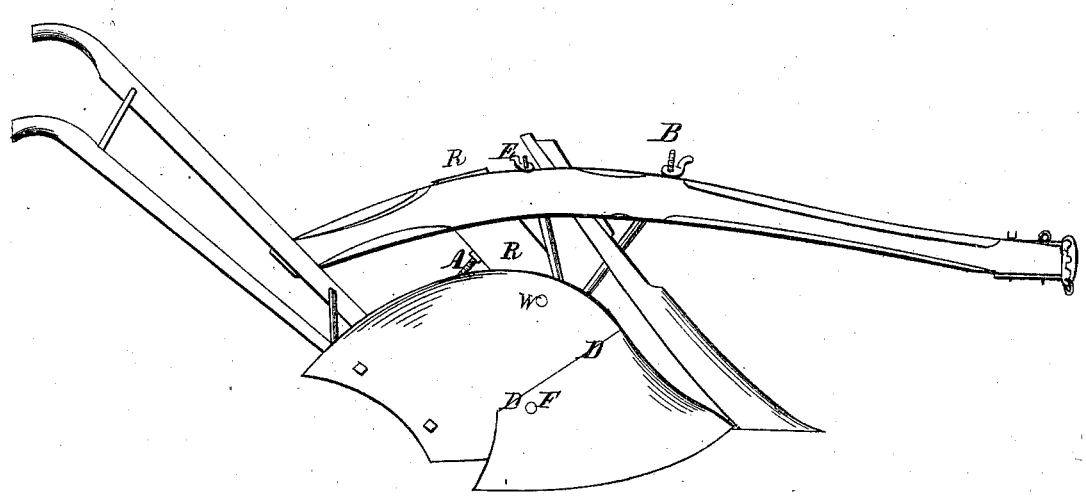

UNITED STATES PATENT OFFICE.

S. MYERS, OF MARION COUNTY, OHIO.

IMPROVEMENT IN PLOWS.

Specification forming part of Letters Patent No. 2,712, dated July 11, 1842.

*To all whom it may concern:*

Be it known that I, SAMUEL MYERS, of the county of Marion and State of Ohio, have invented a new and valuable Improvement in the Making of Plows; and I do hereby declare that the following is a full and accurate description thereof.

The plow constructed agreeably to the improvement above mentioned is the plow in common use with the improvements hereinafter mentioned, and is capable of being set deeper or shallower by means of the large bolt marked B B in the accompanying drawings. This bolt B B is formed with a hook at the lower end and a screw and nut at the upper end, and is fastened by the hook to a cross-piece of iron,(marked C,) and made for that purpose to run from near the middle of the landside (marked O O, to the point of the wing of the share, running laterally forward and upward, passing through the sheth and through the beam, before the colter-mortise, where it is fastened by the screw and nut at the upper end, by tightening the nut on the upper end of which, after loosening the nut on the bolt A and loosening the nut on the false colter E E, the plow will be set deeper, the bolt B B, by tightening the nut, drawing the shank of the share up and throwing the point down, the bolt A and false colter E E working loosely in the apertures into which they are inserted in the sheth and beam, allowing them to accommodate themselves to the altered position of the plow. The plow may be set shallower by means of the small bolt marked A in the accompanying drawings, which bolt has a screw and nut on the upper end, and the lower end is flat, with a square hole or eye punched through it; after putting the nut onto the upper end of which and turning the nut down four or five inches from the upper end, the lower end is inserted into an orifice in the fore part of the lower end of the great handle at the shank of the share, and the heel-screw is inserted into and through the eye or hole in the lower end of said bolt A, and the upper end is inserted into an orifice made for that purpose in the upper posterior part of the sheth R R, a little below the beam, extending upward and forward nearly or quite half-way through the sheth, in which it (said bolt) will work loosely. The nut being on the rod below where it is inserted into the sheth, by screwing the nut on it up against the sheth, after loosening the nut on the large bolt B B, the plow will be set shallower. The nut on the false colter must then be tightened to draw the head up firmly against the sheth and sheth-socket, the tightening the nut on the bolt A forcing the shank of the share down and throwing the point up, the large bolt B B working loosely in the orifices into which it is inserted through the sheth and beam, and the false colter working loosely in the fore end of the sheth-socket and groove in the fore part of the lower end of the sheth, allowing them to accommodate themselves to the altered position of the plow.

The mold-board is fastened to the sheth by means of a round bolt marked W, with a screw and nut on one end, running through the sheth, and secured by the nut against the back of the sheth.

The share is fastened to the mold-board by means of a bolt, F, with a screw and nut inserted through the share and mold-board a little back of the middle of the lap-joint and through the center of the lap, so that in setting the plow the position of the mold-board is changed by the change of the position of the share, the mold-board turning upon the round bolt W, adapting its position to the set of the plow, the bolt F preserving the lap-joint undisturbed.

The false colter E E is inserted into the fore end of the sheth-socket T T, passing about three inches through a groove cut in the fore part of the lower end of the sheth R R, upward and backward through the beam about midway between the sheth-mortise and colter-mortise. This false colter has a screw and nut on the upper end, and on the lower end a flat oblong head about two inches long, extending out about three-fourths of an inch at each end from the rod or body of the false colter, and from a half to three-quarters of an inch wide, and which false colter is so inserted that the length of the head runs backward and forward nearly on a line with the beam, by tightening the nut on the upper end of which the fore end of the head is drawn firmly up against the lower side of the fore end of the sheth-socket T T and the hind end of the head is drawn firmly up against the lower end of the sheth R R, thus making the sheth and false colter firmly support each other, and the sheth-socket being longer than the width of the sheth, allowing the whole irons to be taken off without removing the false colter by simply loosening the nut on the upper end of the false colter E E and the long bolt B B and taking the screw F out of the mold-board and the screw G out of the shank of the share.

The share is made concave underneath, and being fastened by welding to the point of the landside O O, and rising from thence and from the edge of the share to the place where it is fitted by a lap-joint to the mold-board, at D D, in such manner as to prevent its being clogged by the earth underneath.

The lap-joint D D is made by the share's passing over the mold-board one inch and a half, in such a manner as to form a close joint.

The fore part of the joint is seven inches and a quarter from the bottom of the share, and from thence the said joint runs obliquely back and downward till within three inches and a quarter of the bottom of the share, and from thence at nearly a right angle to the lower part of the mold-board.

What I claim as my improvement, and desire to secure by Letters Patent, is—

The mode of altering the set of the plow by means of the rods B, E, and A, combined and operating in the manner herein set forth.

SAMUEL MYERS.

Witnesses:
JAS. H. GODMAN,
G. H. BUSBY.